No. 647,304. Patented Apr. 10, 1900.
A. A. JACCARD.
DEVICE FOR AUTOMATICALLY INTERCHANGING NOTE DISKS IN MUSICAL BOXES.
(Application filed Mar. 14, 1899.)
(No Model.) 6 Sheets—Sheet 1.
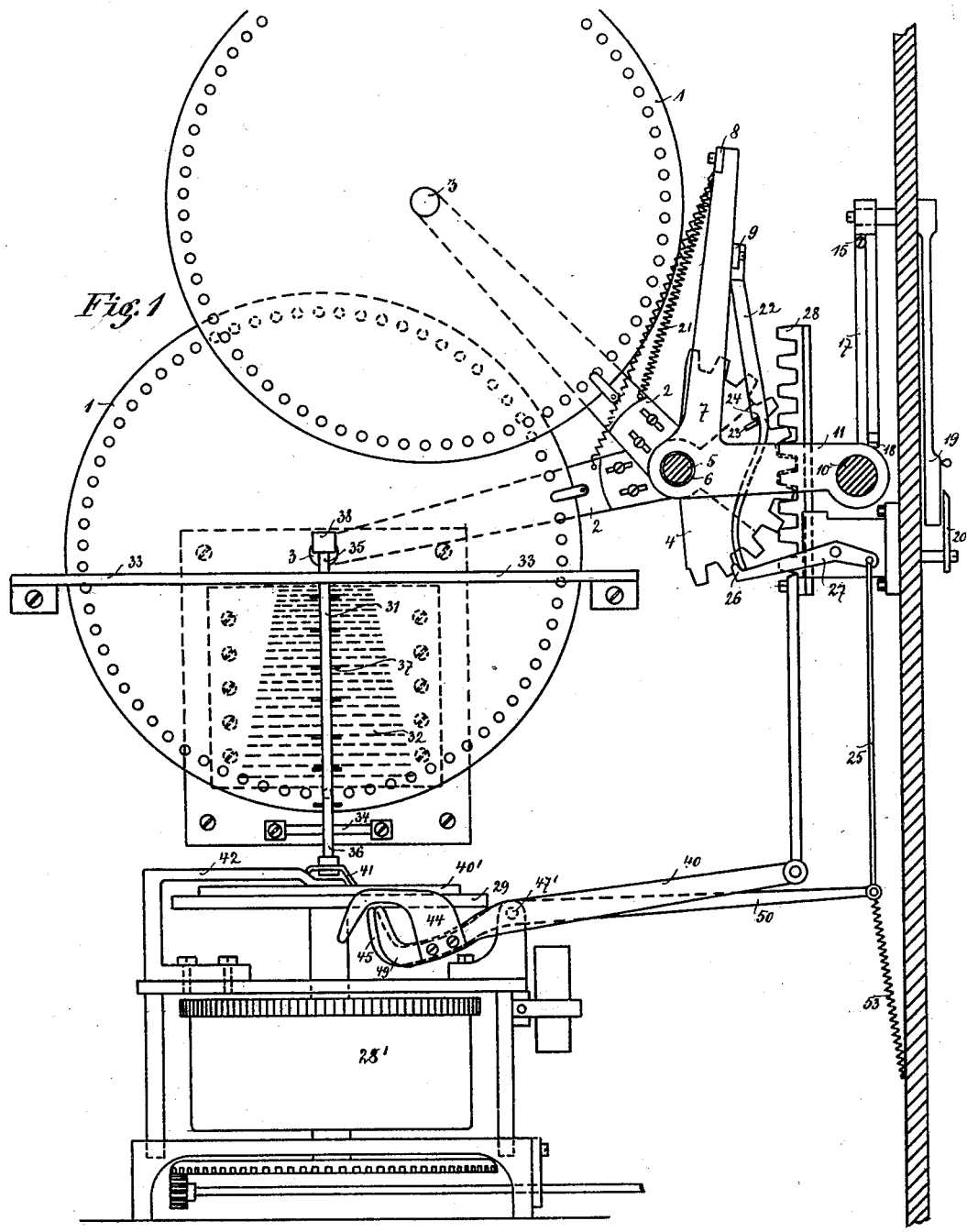
WITNESSES
INVENTOR
Alfred Auguste Jaccard
BY
Richardson
ATTORNEYS No. 647,304. Patented Apr. 10, 1900.
A. A. JACCARD.
DEVICE FOR AUTOMATICALLY INTERCHANGING NOTE DISKS IN MUSICAL BOXES.
(Application filed Mar. 14, 1899.)
(No Model.) 6 Sheets—Sheet 2.
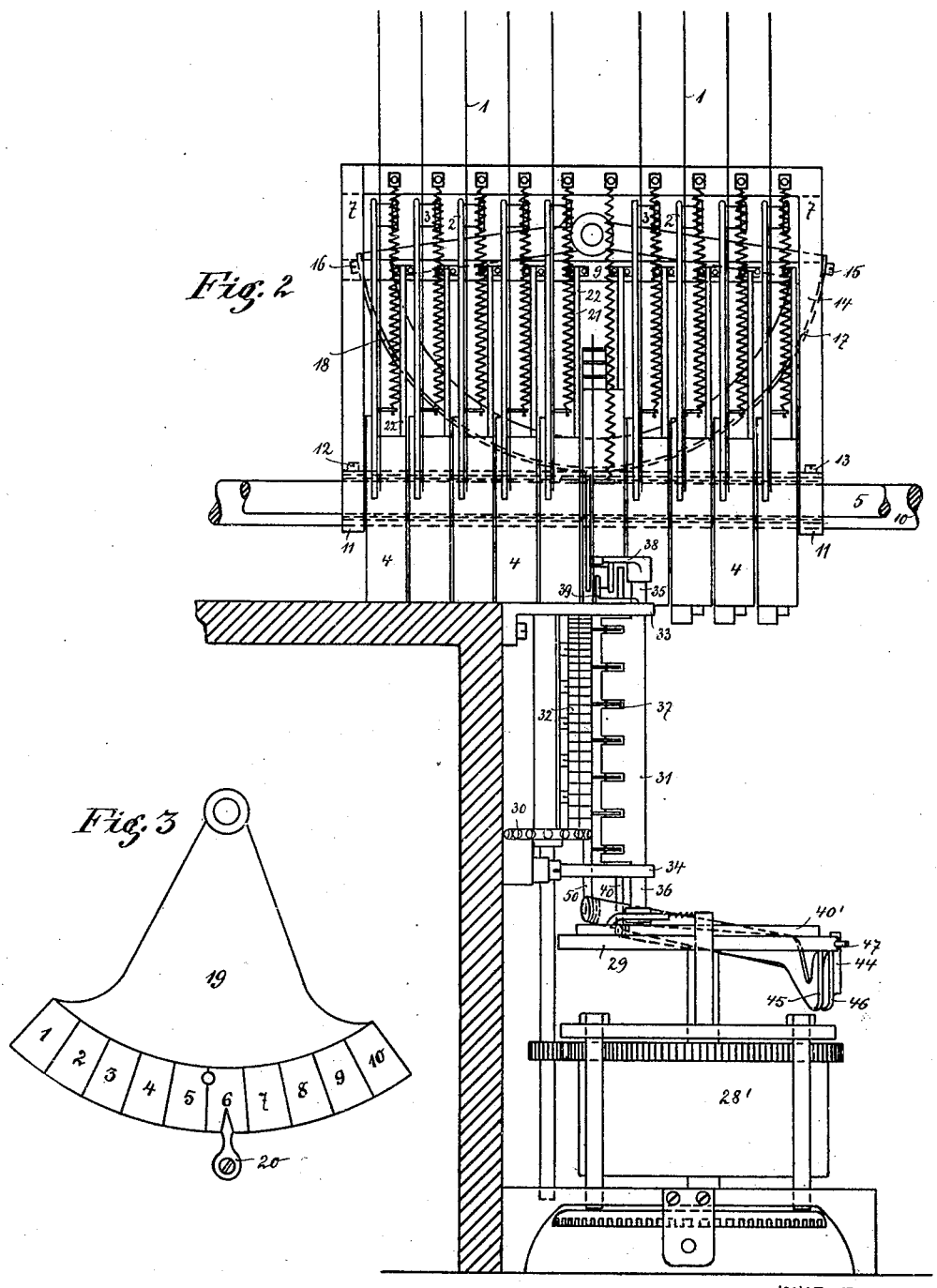
WITNESSES
INVENTOR
Alfred Auguste Jaccard
BY
Richardson
ATTORNEYS No. 647,304. Patented Apr. 10, 1900.
A. A. JACCARD.
DEVICE FOR AUTOMATICALLY INTERCHANGING NOTE DISKS IN MUSICAL BOXES.
(Application filed Mar. 14, 1899.)
(No Model.) 6 Sheets—Sheet 3.
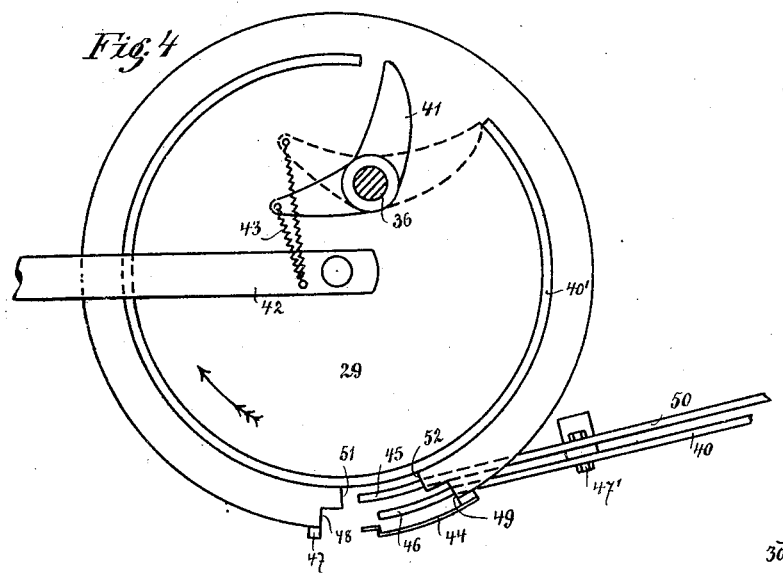
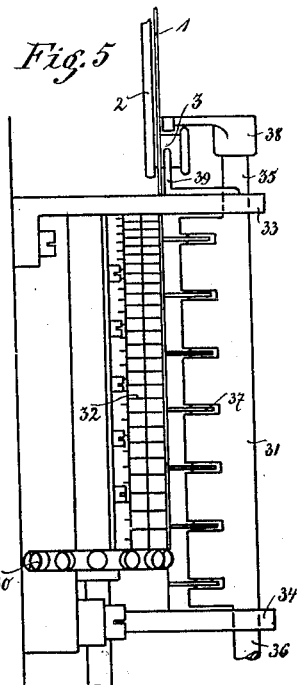
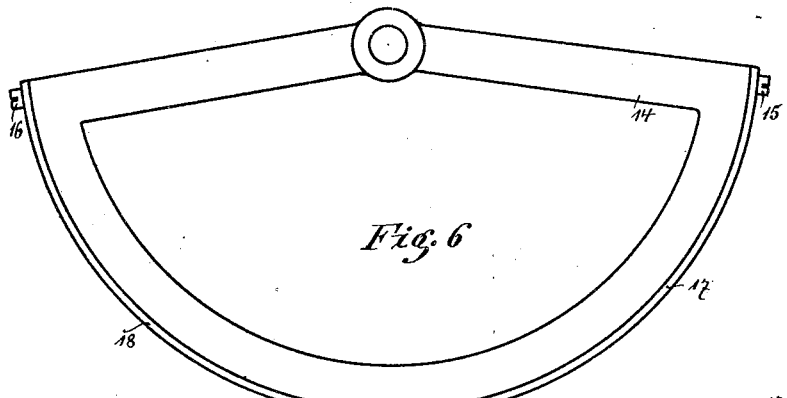
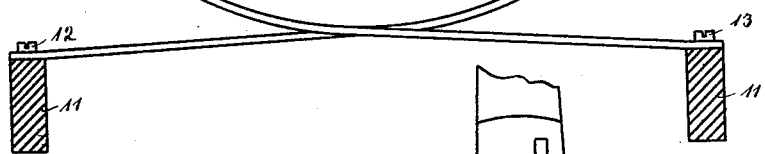
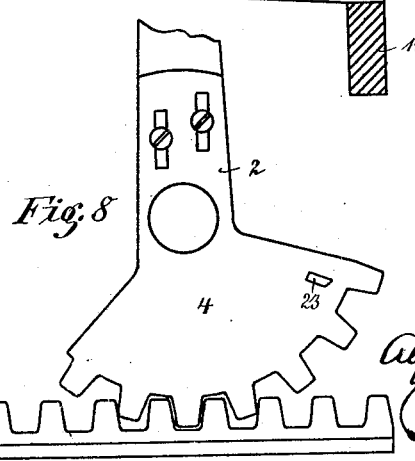
WITNESSES:
Ella L. Giles
INVENTOR
Alfred Auguste Jaccard
BY
Richardson
ATTORNEYS
THE NORRIS PETERS CO., PHOTO-LITHO., WASHINGTON, D. C.

No. 647,304. Patented Apr. 10, 1900.
A. A. JACCARD.
DEVICE FOR AUTOMATICALLY INTERCHANGING NOTE DISKS IN MUSICAL BOXES.
(Application filed Mar. 14, 1899.)
(No Model.) 6 Sheets—Sheet 4.
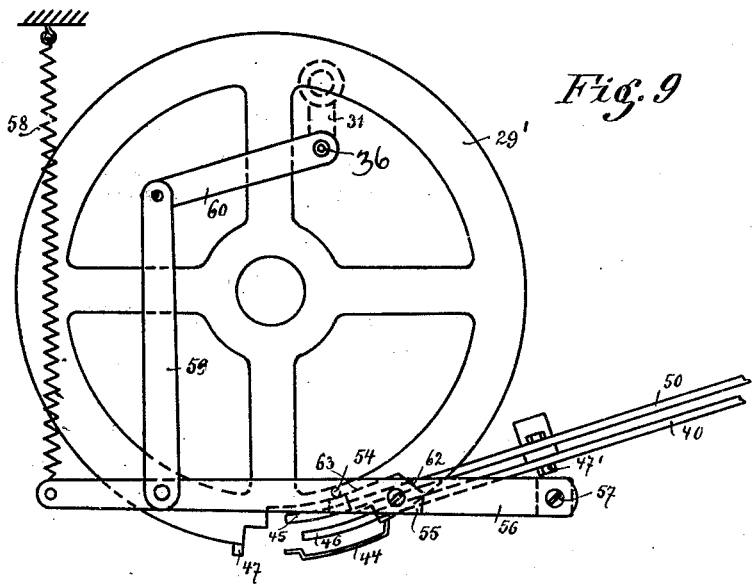
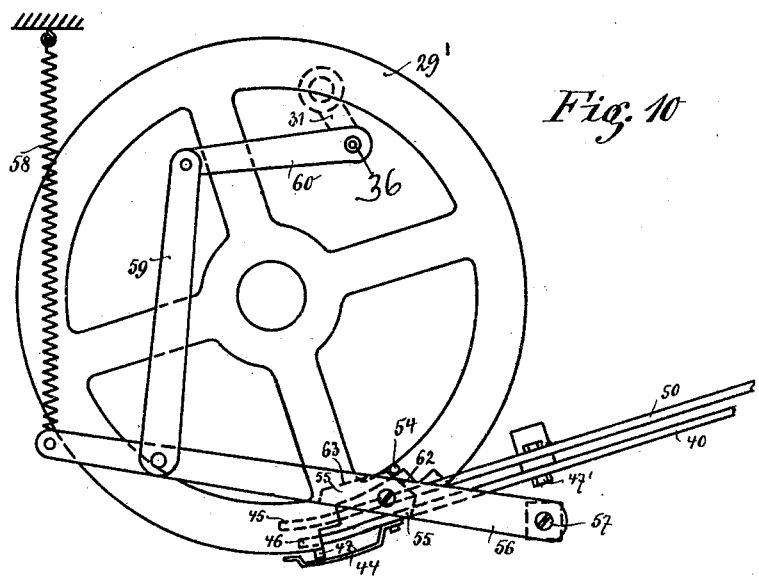
WITNESSES:
Ella L. Giles
INVENTOR
Alfred Auguste Jaccard
BY
Richardson
ATTORNEYS No. 647,304. Patented Apr. 10, 1900.
A. A. JACCARD.
DEVICE FOR AUTOMATICALLY INTERCHANGING NOTE DISKS IN MUSICAL BOXES.
(Application filed Mar. 14, 1899.)
(No Model.) 6 Sheets—Sheet 5.
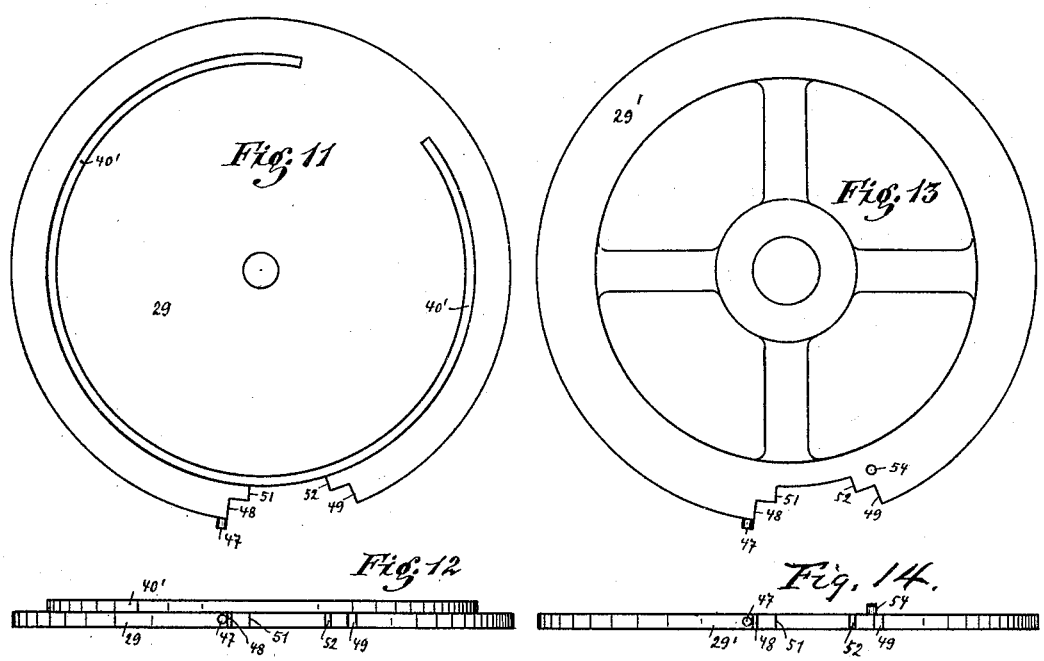
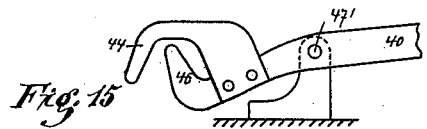
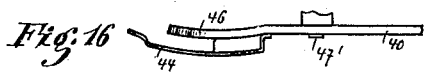
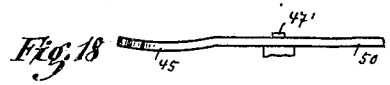
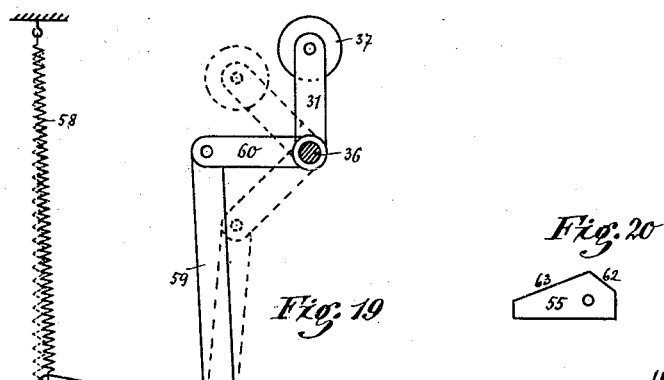
WITNESSES:
Ella L. Giles
INVENTOR
Auguste Jaccard
BY
ATTORNEYS No. 647,304. Patented Apr. 10, 1900.
A. A. JACCARD.
DEVICE FOR AUTOMATICALLY INTERCHANGING NOTE DISKS IN MUSICAL BOXES.
(Application filed Mar. 14, 1899.)
(No Model.) 6 Sheets—Sheet 6.
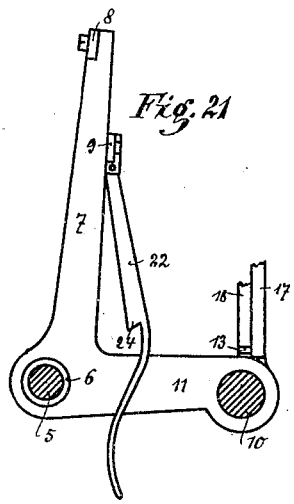
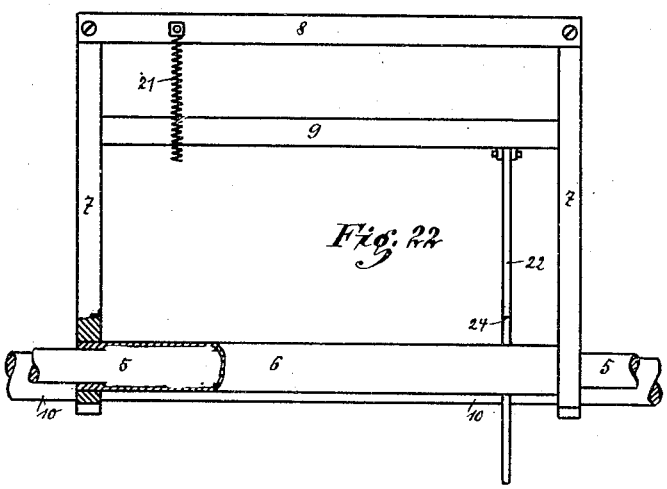
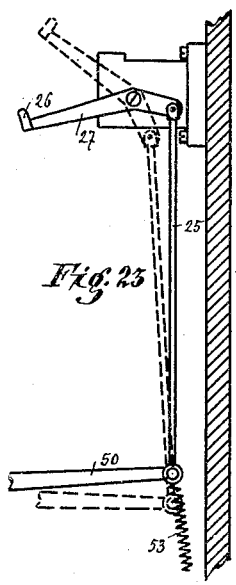
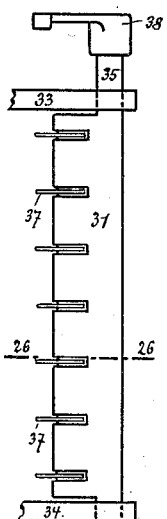
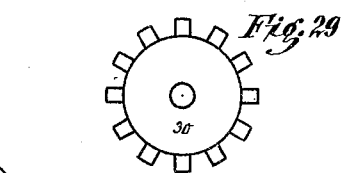
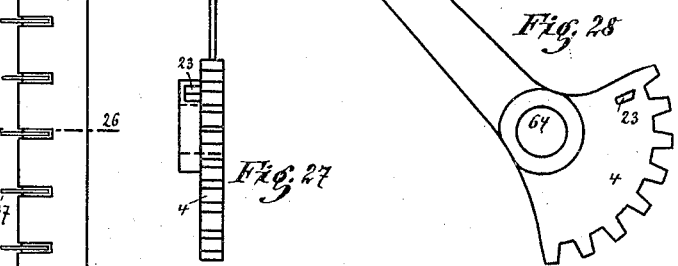
WITNESSES:
Ella L. Giles
INVENTOR
August Jaccard
BY
Richards R
ATTORNEYS

UNITED STATES PATENT OFFICE.

ALFRED AUGUSTE JACCARD, OF STE. CROIX, SWITZERLAND, ASSIGNOR TO HERMANN THORENS, OF SAME PLACE.

DEVICE FOR AUTOMATICALLY INTERCHANGING NOTE-DISKS IN MUSICAL BOXES.

SPECIFICATION forming part of Letters Patent No. 647,304, dated April 10, 1900.

Application filed March 14, 1899. Serial No. 709,030. (No model.)

*To all whom it may concern:*

Be it known that I, ALFRED AUGUSTE JACCARD, a citizen of the Republic of Switzerland, residing at Ste. Croix, in the Republic of Switzerland, have invented certain new and useful Improvements in Devices for Automatically Interchanging Note-Disks in Musical Boxes, of which the following is a full, clear, and exact description.

The present invention concerns a device for the mechanical interchange of note-disks in musical boxes or automatons, whereby one of the note-disks arranged in any number adjustably and pivotally on an arbor or shaft by means of special disk-holders is turned out from its position, so that it is seized by the note-holder and held in service position in engagement with the music mechanism. When the piece in question is played, the connection between the note-holder and the note-disk is detached, so that the latter returns to its former position. Thus the note-disks arranged on the common shaft are shifted, and consequently any other note-disk can be geared by the interchanging mechanism with the mechanism proper operating the box.

The subject of the present invention is illustrated in the accompanying drawings, in which—

Figure 1 shows the ensembled arrangement in front view. Fig. 2 is the corresponding side view. Fig. 3 illustrates the indicating device, showing the piece to be played. Fig. 4 represents one form of the directing-disk in diagram, as well as the levers and hooks serving to turn over the note-holder and for the actuation of the disk-holder. Fig. 5 shows the note-holder seen from the side. Fig. 6 represents the sector 14, on which two bands 17 18 are joined in such a manner that in a revolution of the same the arms 11 of the end pieces 7, receiving the extremities of the bands, are shifted. Fig. 7 shows the locking thumb or tappet set on the upper peg 35 of the note-holder 31. Fig. 8 illustrates how the sector 4 of the disk to be played carried by the disk-holder is turned by the shifting of the rack 28. Figs. 9 and 10 represent modified forms of the guiding-disk and its adjacent parts, Fig. 10 showing the parts in a different position from that of Fig. 9. Fig. 11 shows the first form of the directing-disk alone. Fig. 12 is a side view of the disk shown in Fig. 11. Figs. 13 and 14 show the second form of the guiding-disk alone in ground plan and elevation. Figs. 15 and 16 show in elevation and ground plan the two hooks 44 and 46 attached to the extremity of the lever 40. Figs. 17 and 18 also represent in elevation and ground plan the hook 45, forming the extremity of the lever 50. Fig. 19 represents the system serving for the turning over of the note-holder in the second modification. Fig. 20 shows a detail. Figs. 21 and 22 represent in front and side view the connection of the two end pieces 7, which are adjustable on the two cylinders 5 and 10 and carry the disk-holder. Figs. 23 and 24 show the lever 27 with its connections, said lever in its reversed position actuating the rod 22. Fig. 25 represents the note-holder. Fig. 26 is a section through the note-holder along the line 26 26, Fig. 25. Figs. 27 and 28 show a disk-holder seen from the front and the side. Fig. 29 illustrates the toothed wheel 30, which is made to revolve by the clockwork 28' and engage with its teeth in the corresponding holes of the note-disk playing just then.

In all figures the individual parts bear the same reference.

The note-disks 1, which are of stamped sheet-iron or pasteboard made in the usual manner, are held on the disk-holders 2, Figs. 1, 2, 27, and 28, by means of the pivots 3, around which they can turn. Each disk-holder possesses a toothed circular sector 4, into the teeth of which a rack 28, Fig. 8, engages. The circular sector represents also a hub, and through its bore a shell 6 is passed, Figs. 21 and 22, on which it can turn freely. All disk-holders 2 are shoved in this manner alongside of each other on the shell 6. The latter is set with its extremities into the end pieces 7, Figs. 21 and 22, which are connected by the rods 8 and 9. On the cross-rod 8 a separate spring 21, Figs. 1 and 2, is arranged for each disk-holder, which always seeks to lift the corresponding disk-holder, but which is not strong enough by itself to hold the same at its highest position. For this purpose a separate rod 22 is linked for each disk-holder on the cross-rod 9. This separate rod has a notch 24, and the sector 4 has a shoulder 23, Figs. 8, 27, and 28, which engage with each other. When the rod 22 has taken hold by its notch of the shoulder 23 of the sector, the corresponding disk-holder is maintained in its raised position, and it can only be lowered when the rod 22 is turned over.

The end pieces 7 have lateral arms 11, Figs. 1, 21, and 22, by which they hold a shaft 10, running parallel to shaft 5. In this manner a parallel displacement of the whole system, consisting of the end pieces 7, with their connecting-pieces, and of the disk-holders 2, with their note-disks 1, is made possible. For the execution of this displacement the bands 17 and 18, Figs. 6 and 21, are fastened on the arms 11 by means of the screws 12 and 13, said bands being locked at their extremities to a sector 14 by means of the screws 15 and 16. The sector is set on a shaft journaled in the box, and this shaft carries at its exterior extremity an arched scale 19, adjustable under the stationary hand 20, Fig. 3. When the scale 19 is turned until, as an instance, the figure "6" and the handle coincide, the end piece 7 at the interior of the box and the elements in connection therewith will be in such a position that the note-disk containing the piece of music No. 6 can be geared with the musical mechanism proper. This musical mechanism may be of any form whatever. In the form represented in the drawings it is assumed that there is an appropriate foundation provided on the resounding-board, Figs. 2 and 5, on which the sound-tongues 32 are fastened. The note-disk, furthermore, does not act directly on these sound-tongues, but only by means of a picking device. (Not represented in the drawings.) The note-disks are provided with holes near the rim, into which the teeth of the wheel 30, Fig. 29, engage. The latter is revolved by the clock mechanism 28', and thus moves the note-disk in the usual manner.

The note-holder 31, Figs. 1, 2, 5, 25, and 26, which presses the note-disks against the picking device, is journaled with its upper pivot 35 in the stay 33 and with its lower pivot in stay 34. It contains the wheels 37, which press against the note-disk and roll on the same. The pivot 35 receives the locking-tappet 38, Fig. 7. The latter, in common with an arm 39, keyed on the stay 33, Fig. 5, holds the pivot 3 of the disk-holder 2, which has descended at that time into the service position and whose disk shall be played. On the lower pivot 36 the part actuated by the guiding-disk and effecting the reversing of the note-holder is then set. Hereinafter two different forms will be described.

In the form represented in Figs. 1, 2, 4, and 11, relating to the guiding-disk 29, driven by the clock mechanism 28', there is an annular shoulder extension 40', showing a gap at the upper side of the guiding-disk, and upon the inner surface of this annular shoulder extension slides one arm of the angle-piece 41, set on the pivot 36 of the note-holder. The other arm of the same is locked by means of a spring 43 to the arm 42, holding the upper pillar for the guiding-disk. Ordinarily this angle-piece lies in the position indicated in dotted lines, pressing with one arm on the annular shoulder 40'; but when the gap turns past the angle-piece the latter snaps back under the influence of the spring 43, and thereby turns the note-holder 31.

In the former case the note-holder 31 is pressed with its little wheels 37 against the note-disk 1 and in the second case it releases it.

In the second form of guiding or directing disks, Figs. 9, 10, 13, 14, 19, and 20, an arm 60 is keyed on the lower pivot 36 of the note-holder, on which the rod 59, connected with the lever 56 by its other extremity, is locked. The lever 56 pivots around a pin 57 and is under the influence of a spring 58, which tends to hold it and therewith the note-holder in the position shown in full lines in Fig. 14. At the lower side of the lever 56 is a shoulder 55, Fig. 20, which engages with a pin 54, provided on the guiding-disk. If this pin presses upon the face 62 of the shoulder, the movement of the note-holder 31 into the position shown in dotted lines, Fig. 19, begins and ceases as soon as the pin 54 leaves the face 63 of the shoulder 55 and the spring 58 begins to exercise its influence again. The guiding-disk 29' also serves to actuate the two levers 50 and 40, Figs. 4, 9, and 10, the former of which ends in the hook 45, while the other carries two hooks 46 and 44. Both levers 40 and 50 are pivotal around a pin 47'. The point of the hook 45 of the lever 50 is kept permanently pressed against the lower part of the guiding-disk by a spring 53, Fig. 1, locked on the other lever end. Now the part of the guiding-disk on which the hook 45 slides is provided with a gap 51 52. Thus when the rim 51 passes off the point of the hook 45 the hook is thrown up by the spring 53, while the lever-arm on which the spring 53 engages descends. The lever 27 is connected at one extremity with the lever 50 by a rod 25. The other extremity is formed by a hook 26, Figs. 1, 23, and 24, bent to one side, which can catch behind the lowest end of the rods 22, and thus can release the engagement between the notch 24 of the rod 22 and the shoulder 23 of the sector 4 in the manner before described.

The hooks 44 and 46, Figs. 15 and 16, of the lever 40 referred to are arranged in the following manner: The point of the hook 46, like the hook 45, slides on the lower side of the guiding-disk 29 and can only rise when the gap 48 49 stands above it. The hook 44 is bent away laterally from the hook 46 and touches a pin 47, arranged at the periphery of the guiding-disk. When the latter revolves in the arrow direction, the slanting on the inner side of the hook 44 causes it to ascend, thus causing the descent of the other arm of the lever 40, on which a rack 28 is attached. The rack gears in the teeth of the disk-holder the music of which is just being played.

The operation of the new interchanging device is as follows: After, for instance, ten note-disks 1 are set on their pivots 3 the system carrying the same and which consists of the connected end pieces 7 is shifted in the manner above described until the number of the piece of music to be played stands on the arched scale 19 under the hand or indicator 20. Neither the rack 28 nor the lever 27 stands in the way of this shifting, because, on the one hand, the teeth of all sectors 4 of the disk-holders 2, fixed at their highest position, are so placed that they can pass freely through the clearings of the racks 28, and, on the other hand, the lower extremity of the rod 22 does not reach as far as the levers 27. Thus when the sector 4 of the disk-holder 2, carrying the note-disk just required, is in engagement with the rack 28 the clock mechanism 28' is actuated, and consequently the guiding-disk 29 begins to revolve. The latter is not yet entirely in the position as represented in Fig. 4. The hook 46 has already snapped upward past the edge 48, while the hook 45 is only now pressed up over the edge 51 by the spring 53 into the clearing or gap 51 52. In this manner the rod 25 is lowered, as above described, and the hook 26 of the lever 27 is raised, whereby the engagement of the rod 22 with the shoulder 23 of the sector in question is released. Now the disk-holder 2 can be turned down into service position, being held now by its spring 21, while its teeth tend to lift the rack 28. Meanwhile the edge 49 strikes against the slant of the hook 46 and thus presses it downward, so that its point slides on the lower side of the guiding-disk. By this movement the rack 28 is raised and the note-disk in question is thus brought into the lower position—the service position. The pivot 3 of the lowered disk-holder moves until it strikes against the arm 39, Fig. 5, on the stay 33. The locking-tappet 38 does not impede it in this movement, because the whole note-holder 31 is still in the reversed position. (Indicated in full lines in Fig. 4 and in dotted lines in Fig. 19.) Now the note-holder 31 returns to its service position, which can be accomplished in two ways, as before explained. The lower rim of the cam 38, which projects a little, holds the pivot 3 of the note-disk 1 in common with the arm 39, and the wheels 37 press this note-disk against the picking device, while the toothed wheel 30 catches into the holes of the disk 1, and thus revolves it. Now the first tones of the pieces to be played resound, and after it is played the note-holder releases its engagement by being turned over by means of the springs 43 or 58. The pivot 3 of the disk-holder 2 is released, and the latter is lifted by its spring 21, which has become possible, as the clearing 48 49 of the guiding-disk already stands over the hook 46. The spring 21 is not strong enough, though, to raise the disk-holder completely into its uppermost position, and this is accomplished by the hook 44. The pin 47 of the guiding-disk steps against the inner slant of this hook, and thus causes the descent of the rack 28. Consequently the disk-holder is raised so far that the notch 24 of the rod 22 catches over the shoulder of the sector 4. At this moment, when all parts have resumed their initial position, the clockwork 28' is automatically arrested. Now a shifting or displacement of the disk-holders can be effected by turning the arched scale 19, which might also be done automatically, so that another piece can be played, and in this operation the individual movements of the parts would be repeated in the aforesaid manner and rotation.

I claim—

1. In combination, the note-disks 1, the disk-holders 2, a shaft upon which said holders may turn, a guide-disk 29, clockwork mechanism for operating the guide-disk, a rack-bar for operating the disk-holders, a lever operated by the guide-disk 29 and connected to the rack for operating the same, a device for pressing the note-disks and means for operating the device to press or release the disk, the said disk-holders being displaceable along their supporting-shaft to bring another note-disk in position for operation, substantially as described.

2. In combination, the note-disks, the holders provided with the toothed segments, the shaft 5 upon which said holders are displaceable longitudinally, the terminal arms 7 supported upon the shaft 5, a second shaft 10, the arms 11 connected with the terminal arms 7 and sliding on the shaft 10, said holders being arranged between the terminal arms, the segment 14 having straps connecting with the arms 11 to shift the terminal arms with the note-disks, and the rack-bar for engaging the toothed segments of the disk-holders, with means for operating the rack, substantially as described.

3. In combination, the series of disk-holders provided with the toothed segments, a shaft supporting the same, to permit them to be shifted longitudinally thereof, means for shifting the whole series of disk-holders, and a rack for engaging the toothed segment when the proper holder is brought into action, substantially as described.

4. In combination, the note-disk, the movable disk-holder having the pivot-pin 3 upon which the disk turns, a revoluble note-holder to press upon the disk or release the same, an arm 38 carried by a portion of the note-holder to engage the pin 3, and an arm 39 acting in conjunction with the arm 38 to hold the pivot-pin 3 in position.

5. In combination, the shaft, the disk-holders comprising the arms with the toothed segments on said shaft, a lock to hold the toothed segments against turning, a rack for operating the toothed segment, a note-holder arranged to press upon or release the disk, a clockwork mechanism, a guide-disk operated thereby having bearings and open spaces, and connections controlled by said bearings and open spaces for operating the rack, the lock and the note-holder, substantially as described.

6. In combination, the guide-disk 29, the clockwork 28' for operating the same, said disk having the angular projection 40' with a part cut away, and having also the spaces 51 52, 48 49 and the pin 47, the lever 50 arranged to be controlled by the guide-disk 29 and its opening 51 52, the disk-holder, a lock therefor, a connection between said lock and the lever 50, a spring 53 for drawing the lever in one direction, a lever 40 having a hook 46 to be controlled by the space 48 49, the rack-bar connected to the lever 40 and to the disk-holder, a note-holder to press upon the note-disk or to release the same, an angle-piece 41 to bear on the angular projection 40' or to be controlled by the space therein, said angle-lever being connected with the note-holder, and a pin 47 on the guide-disk to operate the lever 40 to operate the rack to raise the disk-holder, substantially as described.

7. In combination, the disk-holder provided with a toothed segment, the rack-bar for engaging the toothed segment, a pivoted locking-bar 22 engaging a part on the toothed segment, a lever 27 engaging the locking-bar 22, means controlling the lever 27 and a spring for raising the disk-holder, substantially as described.

In witness whereof I have hereunto set my hand in presence of two witnesses.

ALFRED AUGUSTE JACCARD.

Witnesses:
E. SCHNEIDER,
E. FAVRE.